United States Patent
Otake et al.

(10) Patent No.: US 8,056,825 B2
(45) Date of Patent: Nov. 15, 2011

(54) HEATING TANK AND HOT WATER STORAGE TANK

(75) Inventors: Masahisa Otake, Ora-machi (JP); Hiroshi Mukaiyama, Chiyoda-machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 770 days.

(21) Appl. No.: 11/987,826

(22) Filed: Dec. 5, 2007

(65) Prior Publication Data
US 2008/0128526 A1 Jun. 5, 2008

(30) Foreign Application Priority Data
Dec. 5, 2006 (JP) .................................. 2006-328124

(51) Int. Cl.
*F24D 11/02* (2006.01)
*F24D 15/02* (2006.01)
(52) U.S. Cl. ........... 237/2 B; 237/19; 126/641; 126/642; 165/54
(58) Field of Classification Search ................... 126/641, 126/642; 237/2 B, 19; 165/286; 29/859.212, 29/447
See application file for complete search history.

(56) References Cited

U.S. PATENT DOCUMENTS

| | | | | |
|---|---|---|---|---|
| 2,662,749 A | * | 12/1953 | Buschow ......................... | 165/141 |
| 2,947,078 A | * | 8/1960 | Pflumm et al. .................. | 228/127 |
| 3,270,780 A | * | 9/1966 | Kydd et al. ...................... | 138/148 |
| 3,372,464 A | * | 3/1968 | Vincent et al. ............. | 228/124.1 |
| 3,458,917 A | | 8/1969 | Mueller | |
| 3,489,309 A | * | 1/1970 | Patel et al. ..................... | 220/586 |
| 3,673,845 A | * | 7/1972 | Vercoglio ......................... | 72/318 |
| 4,002,200 A | * | 1/1977 | Raskin ........................... | 165/131 |
| 4,128,126 A | * | 12/1978 | Forster et al. .................. | 165/165 |

(Continued)

FOREIGN PATENT DOCUMENTS
CN 2746313 Y 12/2005
(Continued)

OTHER PUBLICATIONS

Chinese Second Office Action, w/ English translation thereof, issued in Chinese Patent Application No. CN 200710193317.1 dated Dec. 4, 2009.

(Continued)

*Primary Examiner* — Steven B. McAllister
*Assistant Examiner* — Phillip E Decker
(74) *Attorney, Agent, or Firm* — McDermott Will & Emery LLP

(57) ABSTRACT

An object is to provide a heating tank capable of highly efficiently heating a target to be heated and having high safety and reliability, and a hot water storage tank. The heating tank in which the target to be heated is stored and which heats the target to be heated by a circulated refrigerant of a heat pump, for example, the hot water storage tank which is heated by the circulated refrigerant of the heat pump to produce hot water in the tank includes a heat exchanger in which a wall surface of a tank main body is partially secured to peripheral edge portions and inner portions of two metal plates and in which non-secured portions swell to constitute a refrigerant passage closed except an inlet and an outlet. A thickness dimension of one metal plate is set to be larger than that of the other metal plate, and the one metal plate is arranged on the inner side of the other metal plate.

1 Claim, 12 Drawing Sheets

U.S. PATENT DOCUMENTS

| | | | | |
|---|---|---|---|---|
| 4,148,355 | A | | 4/1979 | Gehring |
| 4,290,275 | A | * | 9/1981 | Disco et al. .................. 62/238.6 |
| 4,305,456 | A | * | 12/1981 | Mueller et al. ................. 165/145 |
| 4,323,115 | A | * | 4/1982 | Stafford et al. ................. 165/79 |
| 4,448,347 | A | * | 5/1984 | Dunstan ........................ 237/2 B |
| 4,452,302 | A | * | 6/1984 | Schoerner ..................... 165/133 |
| 5,167,274 | A | * | 12/1992 | Mueller ......................... 165/301 |
| 5,772,113 | A | * | 6/1998 | Gerstmann et al. ............ 237/8 R |
| 6,115,919 | A | * | 9/2000 | Oswald et al. ........... 29/890.039 |
| 6,276,442 | B1 | * | 8/2001 | Rasmussen .................. 165/110 |
| 7,691,337 | B2 | * | 4/2010 | Bindelle et al. ............... 422/138 |
| 2004/0086765 | A1 | * | 5/2004 | Florence et al. ................ 429/34 |
| 2007/0266714 | A1 | * | 11/2007 | Fiedler ............................... 62/6 |

FOREIGN PATENT DOCUMENTS

| | | | |
|---|---|---|---|
| CN | 2826284 | Y | 10/2006 |
| DE | 44 16 645 | A1 | 11/1995 |
| FR | 2 554 915 | A1 | 5/1985 |
| JP | 61134596 | A * | 6/1986 |
| JP | 2001-221500 | | 8/2001 |
| WO | WO 99/58920 | | 11/1999 |
| WO | WO 03/038342 | A1 | 5/2003 |

OTHER PUBLICATIONS

Chinese Third Office Action, w/ English translation thereof, issued in Chinese Patent Application No. CN 200710193317.1 dated Mar. 29, 2010.

Chinese Office Action, w/ English translation thereof, issued in Chinese Patent Application No. CN 2007101933171 dated Jun. 12, 2009.

European Search Report issued in European Patent Application No. EP 07023163.4 dated Sep. 28, 2010.

* cited by examiner

HEATING TANK AND HOT WATER STORAGE TANK

BACKGROUND OF THE INVENTION

The present invention relates to a heating tank which heats a target to be heated stored by a circulated refrigerant of a heat pump in the tank, and a hot water storage tank.

Heretofore, in this type of heating tank, for example, a hot water storage tank in which hot water is stored, water (a target to be heated) has been heated by a circulated refrigerant of a heat pump to produce the high-temperature hot water. The hot water is stored in the hot water storage tank, and the hot water stored in the hot water storage tank is taken out, if necessary. Specifically, the hot water storage tank is connected to a heat exchanger via a pipe, and the hot water produced via the heat exchanger is stored in the hot water storage tank.

However, in a case where the hot water produced via the heat exchanger is stored in the hot water storage tank in this manner, a pump for feeding water is required for circulating the water through the heat exchanger, and there has occurred a problem that a device cost and a power consumption increase. Furthermore, since the high-temperature hot water produced by the heat exchanger returns to the hot water storage tank via the pipe, reliability of a component such as the pipe needs to be sufficiently considered, and there are many problems that the temperature of the hot water drops in a process of passing the hot water through the pipe, to result in heat loss and the like.

To solve the problem, there has been developed a device in which the heat exchanger is incorporated in the hot water storage tank, or a refrigerant pipe of the heat exchanger is wound around a wall surface of the hot water storage tank, to directly heat the water in the hot water storage tank by the circulated refrigerant of the heat pump, for example, a device in which a so-called heat release section of the heat pump is provided integrally in the hot water storage tank (e.g., see Japanese Patent Application Laid-Open No. 2001-221500).

However, as in the former case, when the pipe where the refrigerant of the heat exchanger flows is incorporated in the hot water storage tank, the above problem of the heat release loss can be solved, but the refrigerant pipe needs to be provided in the hot water storage tank. When the pipe is cracked or broken, the water in the hot water storage tank is polluted, and there have been many problems of safety and reliability.

On the other hand, as in the latter case, when the refrigerant pipe of the heat exchanger is wound around the wall surface of the hot water storage tank, heat of the refrigerant is conducted to the water in the tank via the pipe and the wall surface, and this lowers heat conductivity. Moreover, since a contact area between the pipe and the wall is very small, an even thermally conductive surface cannot be secured, and efficiency deteriorates.

SUMMARY OF THE INVENTION

The present invention has been developed to solve such a problem of a conventional technology, and an object thereof is to provide a heating tank capable of highly efficiently heating a target to be heated and having high safety and reliability, and a hot water storage tank.

In a heating tank of a first invention, a target to be heated is stored, the heating tank heats the target to be heated by a circulated refrigerant of a heat pump, and the heating tank is characterized by comprising a heat exchanger in which a wall surface is partially secured to peripheral edge portions and inner portions of two metal plates and in which non-secured portions swell to constitute a refrigerant passage closed except an inlet and an outlet.

The heating tank of a second invention is characterized in that in the above first invention, a thickness dimension of one of the metal plates is set to be larger than that of the other metal plate, and the one metal plate is arranged on the inner side of the other metal plate.

The heating tank of a third invention is characterized in that in the above first or second invention, the heat exchanger has a cylindrical shape, and constitutes a tank main body.

The heating tank of a fourth invention is characterized in that in the above third invention, a cylindrical partition plate is concentrically arranged with a space from the inner side of the tank main body.

A hot water storage tank of a fifth invention is heated by a circulated refrigerant of a heat pump to produce hot water therein, and is characterized by comprising a heat exchanger provided in the hot water storage tank and including two metal plates in which peripheral edge portions and inner portions of both the metal plates are partially secured and in which non-secured portions swell to constitute a refrigerant passage closed except an inlet and an outlet.

The hot water storage tank of a sixth invention is characterized in that the fifth invention includes a cylindrical tank main body, and the heat exchanger has a cylindrical shape, and is arranged concentrically with the tank main body.

The hot water storage tank of a seventh invention is characterized in that in the sixth invention, an insulating material is provided at an inner side surface of the heat exchanger.

The hot water storage tank of an eighth invention is characterized in that in the sixth or seventh invention, a plurality of heat exchangers are concentrically arranged.

According to the first invention, the target to be heated is stored in the heating tank, the heating tank heats the target to be heated by the circulated refrigerant of the heat pump, and the heating tank comprises the heat exchanger in which the wall surface is partially secured to the peripheral edge portions and the inner portions of the two metal plates and in which the non-secured portions swell to constitute the refrigerant passage closed except the inlet and the outlet, so that the target to be heated in the heating tank can substantially directly be heated by the refrigerant which flows along the wall surface. In consequence, heat loss can be eliminated.

Furthermore, since the refrigerant flows through the refrigerant passage formed between two plates, a temperature distribution of a thermally conductive surface can remarkably be uniformed. In consequence, a heat exchange performance between the refrigerant and the target to be heated in the heating tank improves, and the target to be heated can highly efficiently be heated.

Especially, in a case where the heating tank is used as a hot water storage tank which heats a liquid such as water to produce hot water or the like, unlike a case where the heat exchanger is provided outside the hot water storage tank, water feeding means such as a water feeding pump is not required, so that a device cost and a power consumption can be reduced.

According to the heating tank of the second invention, in the first invention, the thickness dimension of one of the metal plates is set to be larger than that of the other metal plate, and the one metal plate is arranged on the inner side of the other metal plate. Therefore, in a case where a high pressure is generated in the passage, the other metal plate having the small thickness dimension is plastically deformed, and broken, and it is therefore possible to avoid a disadvantage that the one metal plate arranged on the inner side of the other metal plate is broken.

Especially, in a case where it is assumed that the heat exchanger has the cylindrical shape and constitutes the tank main body as in the third invention, it is possible to avoid a disadvantage that the target to be heated stored in the heating tank on an inner side of the one metal plate is polluted. In consequence, safety and reliability of the heating tank including the heat exchanger can be improved.

Furthermore, in a case where the heating tank is used as the hot water storage tank which heats a liquid such as the water to produce the hot water or the like, when the cylindrical partition plate is concentrically arranged with a space from the inner side of the tank main body as in the fourth invention, a space between the partition plate and the heat exchanger can be separated as a hot water production area from a cold water area on the inner side of the partition plate. In consequence, cold water supplied from a lower part of the hot water storage tank can be heated in the hot water production area to produce high-temperature hot water, and the produced high-temperature hot water can effectively be stored in an upper part of the hot water storage tank. Therefore, without impairing production layers of the hot water and the cold water as much as possible, the hot water can be produced and stored.

According to the fifth invention, the hot water storage tank is heated by the circulated refrigerant of the heat pump to produce the hot water therein, and comprises the heat exchanger provided in the hot water storage tank and including two metal plates in which the peripheral edge portions and the inner portions of both the metal plates are partially secured and in which the non-secured portions swell to constitute the refrigerant passage closed except the inlet and the outlet. Therefore, the water in the hot water storage tank can substantially directly be heated and stored. In consequence, heat loss can be eliminated. Since water feeding means such as a water feeding pump is not required, a device cost and a power consumption can be reduced.

Furthermore, since the refrigerant flows through the refrigerant passage formed between two plates, a temperature distribution of a thermally conductive surface can remarkably be uniformed.

In addition, according to the hot water storage tank of the sixth invention, the fifth invention includes the cylindrical tank main body, and the heat exchanger has the cylindrical shape, and is arranged concentrically with the tank main body, so that the water in the whole hot water storage tank can efficiently be heated. In consequence, the hot water can be highly efficiently be produced.

Especially, when the insulating material is provided at the inner side surface of the heat exchanger as in the seventh invention, a space where the heat exchanger outside the insulating material is present can be separated as a hot water production area from a cold water area on an inner side of the insulating material. In consequence, cold water supplied from a lower part of the hot water storage tank can be heated in the hot water production area to produce high-temperature hot water, and the produced high-temperature hot water can effectively be stored in an upper part of the hot water storage tank.

Furthermore, in the sixth or seventh invention, when the plurality of heat exchangers are concentrically arranged as in the eighth invention, the hot water can more efficiently be produced, and the produced high-temperature hot water can be stored in the upper part of the hot water storage tank. In consequence, without impairing production phases of the hot water and the cold water, the hot water can be produced and stored.

DETAILED DESCRIPTION OF THE PREFERRED EMBODIMENT

The present invention relates to a heating tank in which a target to be heated is stored and which heats the target to be heated by a circulated refrigerant of a heat pump to store the target, and a hot water storage tank, and the present invention has been developed to eliminate steep rise of a device cost and a power consumption, eliminate heat loss, and solve problems of safety and reliability generated in a case where the heating tank includes a heat exchanger, or prevent deterioration of efficiency due to drop of thermal conductivity or the like. An object to provide the heating tank in which the target to be heated can highly efficiently be heated and which has high safety and reliability is realized by a constitution where the heating tank is constituted by a heat exchanger in which the wall surface is partially secured to peripheral edge portions and inner portions of two metal plates and in which non-secured portions swell to constitute a refrigerant passage closed except an inlet and an outlet. Embodiments of the present invention will hereinafter be described in detail with reference to the drawings.

Embodiment 1

Figure 1:
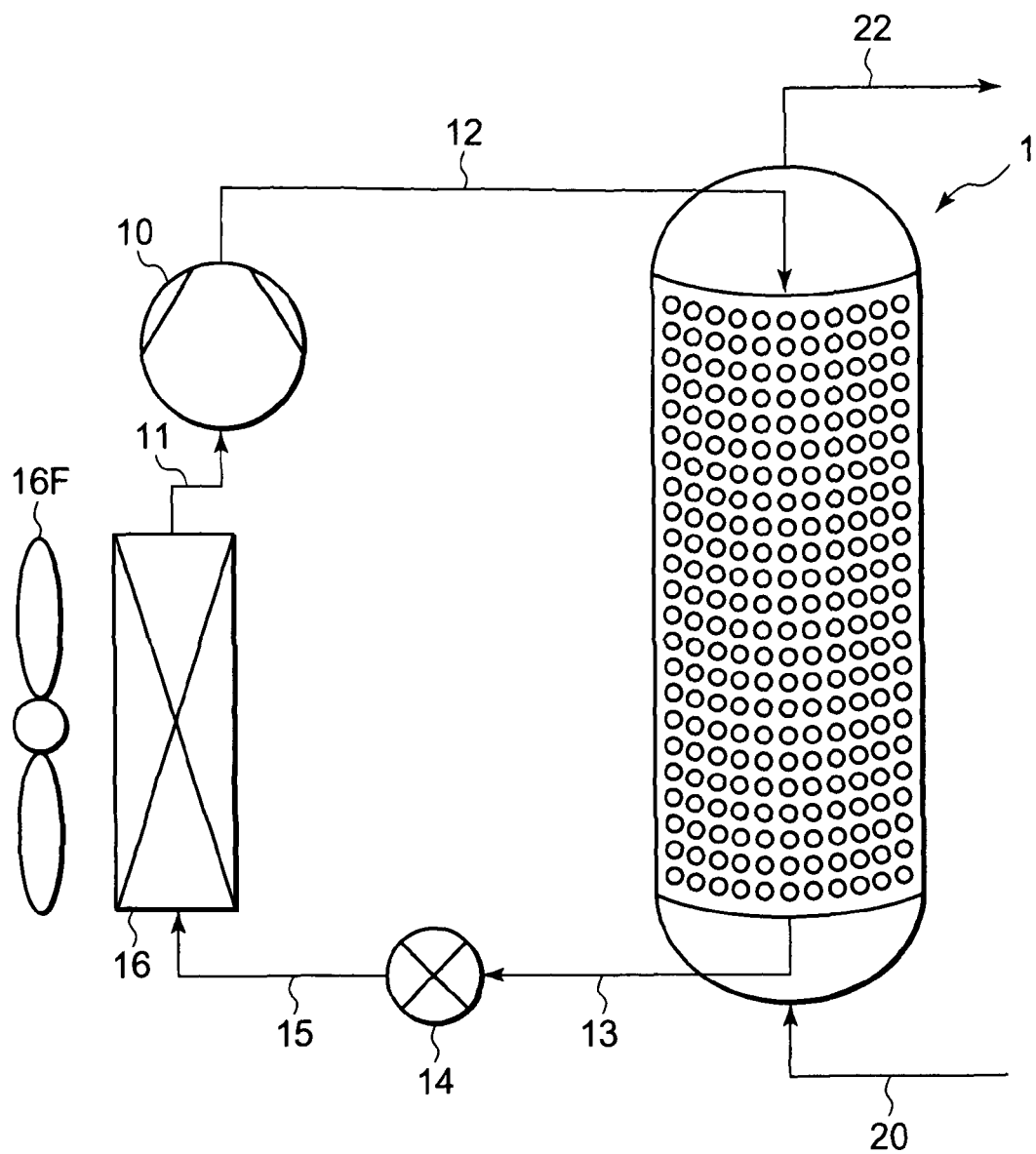
FIG. 1 is a refrigerant circuit diagram of a heat pump device including a hot water storage tank as one embodiment of a heating tank of the present invention.

First, one embodiment in a case where a heating tank of the present invention is applied to a hot water storage tank will be described. FIG. 1 is a refrigerant circuit diagram of a heat pump device including the hot water storage tank according to the present embodiment. A hot water storage tank 1 of the embodiment is a hot water storing tank of a hot water supply device having a function of a heat exchanger which releases heat of a circulated refrigerant of a heat pump. The tank constitutes a refrigerant circuit together with a compressor 10, an expansion valve (a pressure reduction unit) 14 and an evaporator 16.

That is, a refrigerant discharge tube 12 of the compressor 10 is connected to a refrigerant passage inlet 7A (not shown in FIG. 1) of the hot water storage tank 1, and a refrigerant pipe 13 connected to a refrigerant passage outlet 7B (not shown in FIG. 1) of the hot water storage tank 1 is connected to the expansion valve 14. Then, a refrigerant pipe 15 connected to an outlet of the expansion valve 14 is connected to the evaporator 16, and an outlet of the evaporator 16 is connected to a refrigerant introduction tube 11 of the compressor 10 to constitute an annular refrigerant circuit. In this refrigerant circuit, carbon dioxide ($CO_2$) is used as a refrigerant. In the embodiment, it is assumed that the carbon dioxide refrigerant is compressed into a supercritical state, and the refrigerant does not condense in the hot water storage tank 1 (the heat exchanger), but a temperature of the tank drops, and the supercritical state changes to a gas-liquid two-phase state by reduction of the pressure in the expansion valve 14.

Then, the high-temperature high-pressure gas refrigerant ($CO_2$) compressed by a compression element (not shown) of the compressor 10 performs heat exchange between the refrigerant and water as a target to be heated contained (stored) in the hot water storage tank 1, to release heat. At this time, the water stored in the hot water storage tank 1 is heated by such heat release of the refrigerant, to form high-temperature hot water.

On the other hand, the refrigerant which has released the heat in the hot water storage tank 1 flows into the expansion valve 14 and is pressed, then liquefied in the process of the pressure reduction, and then achieves a gas-liquid two-phase state. Then, the refrigerant flows into the evaporator 16, takes heat from the air (outside air) blown by a fan 16F in the evaporator, and evaporates. The refrigerant which has exited from the evaporator 16 repeats a supercritical freezing cycle in which the refrigerant is sucked into the compressor 10 from the refrigerant introduction tube 11.

Figure 2:
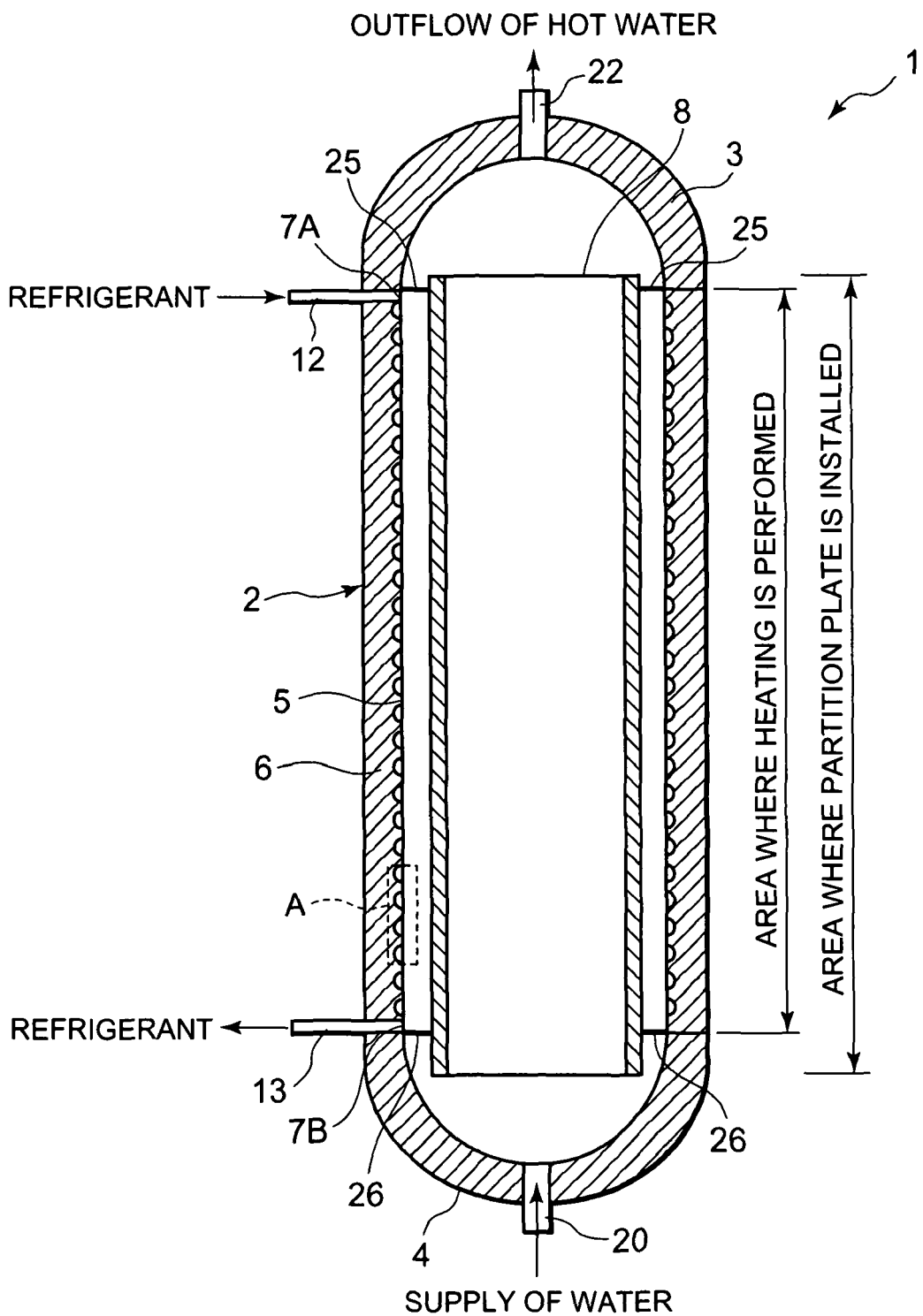
FIG. 2 is a vertically sectional view of the hot water storage tank of FIG. 1.
Figure 3:
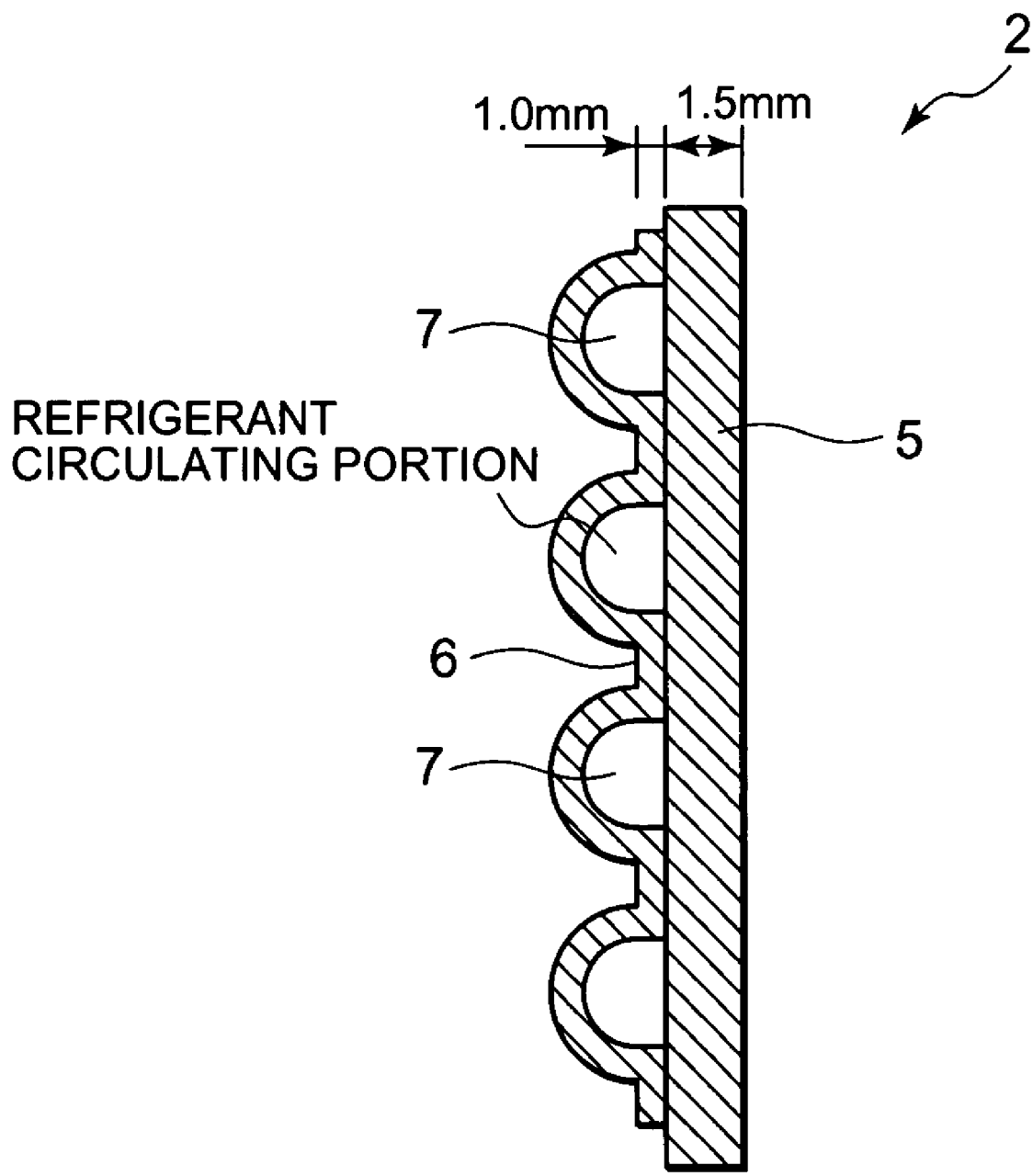
FIG. 3 is a partially enlarged view of a range A shown in FIG. 2.
Figure 4:
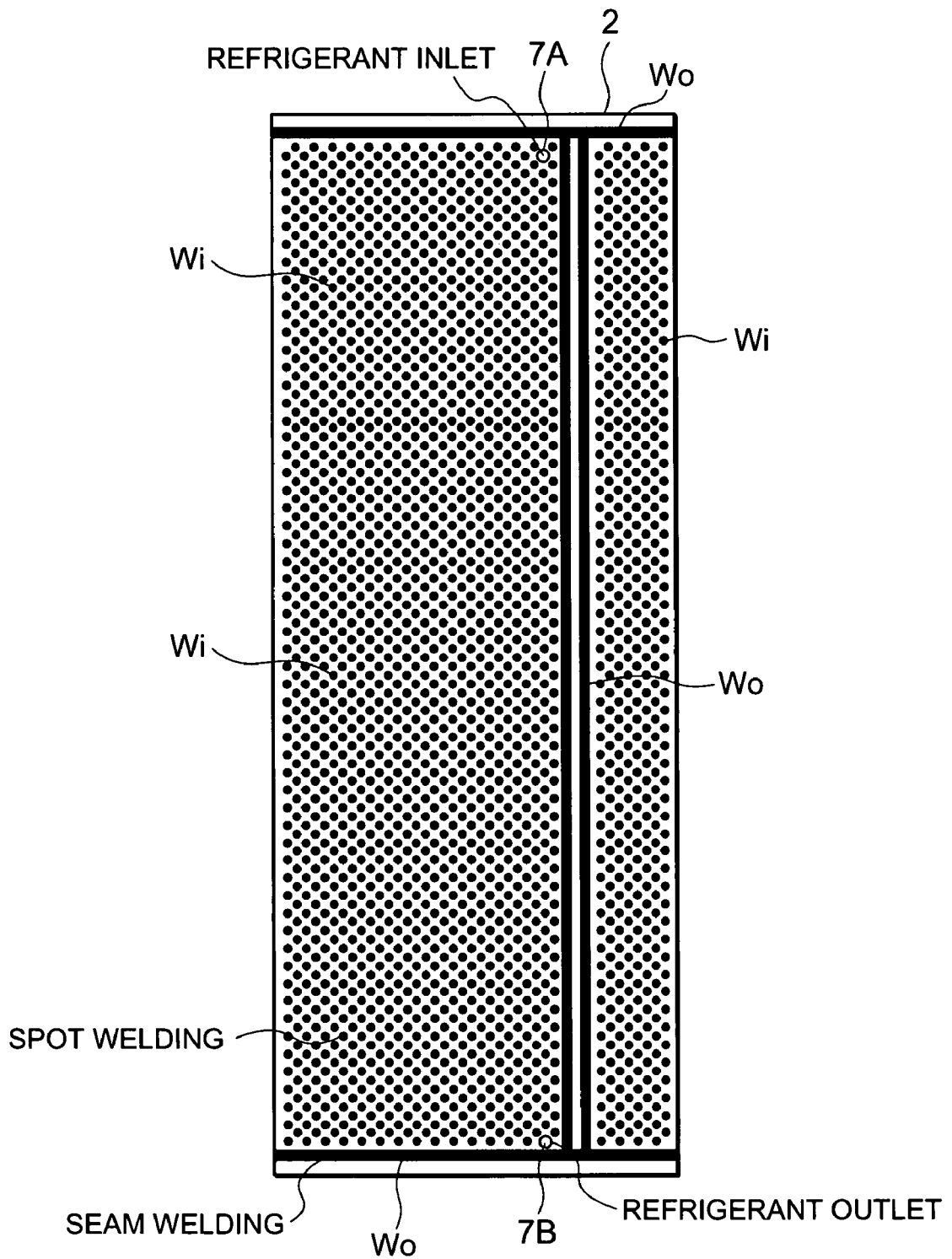
FIG. 4 is a side view of a tank main body of the hot water storage tank of FIG. 2.
Figure 5:
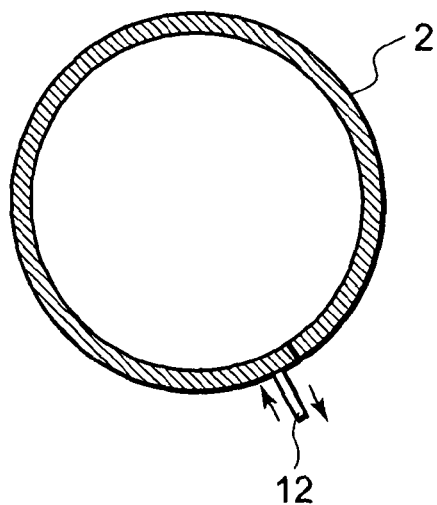
FIG. 5 is a plan view of the tank main body of the hot water storage tank of FIG. 2.

Next, the hot water storage tank 1 of the present embodiment will be described in detail with reference to FIGS. 2 to 5. FIG. 2 shows a vertically sectional view of the hot water storage tank 1 of the embodiment, FIG. 3 shows a partially enlarged view of a range A shown in FIG. 2, FIG. 4 shows a side view of a tank main body 2 of the hot water storage tank 1 of FIG. 2, and FIG. 5 shows a plan view of the tank main body 2 of FIG. 4, respectively. The hot water storage tank 1 of the embodiment is constituted of the tank main body 2 having a cylindrical shape, a cap part 3 welded to one end (an upper end in FIGS. 2 and 4) of the tank main body 2, and a bottom part 4 welded to the other end (a lower end in FIGS. 2 and 4) of the tank main body 2.

The tank main body 2 of the present embodiment is constituted of a heat exchanger. Specifically, the tank main body 2 is constituted of a heat exchanger in which a wall surface is partially secured to peripheral edge portions and inner portions of two metal plates 5, 6 and in which non-secured portions swell to constitute a refrigerant passage 7 (a refrigerant circulating section) closed except an inlet 7A and an outlet 7B. In this case, hot water to be supplied is stored at an inner surface of the metal plate 5 arranged on the inner side of the other metal plate. In FIG. 4, Wi indicates secured portions formed by partially securing the inner portions of the metal plates 5, 6, and in the embodiment, the secured portions Wi are formed by spot welding of the metal plates 6 and 5 from one surface side (the side of the surface opposite to the side where the metal plate 5 is positioned) of the metal plate 6. Moreover, Wo indicates secured portions of the peripheral edge portions of the metal plates 5, 6, and in the embodiment, the secured portions Wo are formed by seam welding of the metal plates 6 and 5 from the one surface side (the side of the surface opposite to the side where the metal plate 5 is positioned) of the metal plate 6.

In a wall surface of the tank main body 2 according to the embodiment, the one metal plate 5 arranged on the inner side is constituted of a plate material of a metal having a thickness dimension of 1.5 mm, and the other metal plate 6 arranged on the outer side is constituted of a plate material of a metal having a thickness dimension of 1.0 mm. That is, the wall surface is constituted of the metal plates having different thickness dimensions, and the one metal plate 5 having a large thickness is arranged on the inner side. Therefore, one surface (an inner surface) of the metal plate 5 comes in contact with the water in the hot water storage tank 1.

The thickness dimension of the one metal plate 5 arranged on the inner side is set to be larger than that of the other metal plate 6 arranged on the outer side in this manner, whereby if a high pressure is generated in the passage 7 formed between both the metal plates 5 and 6, the outer metal plate 6 completely blocked from the contact with the water in the hot water storage tank 1 is plastically deformed and broken. For example, in a case where a plate thickness of the inner metal plate 5 which comes in contact with the water in the tank 1 is set to be equal to or smaller than that of the outer metal plate 6, when the high pressure is generated in the passage 7 formed between both the metal plates 5 and 6, the metal plate 5 might be deformed and broken. Thus, in a case where the metal plate 5 which comes in contact with the water in the hot water storage tank 1 is deformed and broken, the refrigerant in the passage 7 and machine oil for lubrication mixed into the refrigerant from the compressor 10 leak into the hot water storage tank 1, and the water in the hot water storage tank 1 is polluted. In consequence, safety and reliability remarkably deteriorate. Especially when the hot water produced in the hot water storage tank 1 is used for beverages, such a problem is not acceptable.

Therefore, as described above, the thickness dimension of the metal plate 5 arranged on the inner side is set to be larger than that of the metal plate 6 arranged on the outer side, so that it is possible to avoid in advance a disadvantage that the metal plate 5 arranged on the inner side to come in contact with the water in the hot water storage tank 1 is deformed and broken. In consequence, safety and reliability of the hot water storage tank 1 can be improved. In addition, it is preferable that the metal plate 5 arranged on the inner side is constituted of at least a material having an excellent resistance to corrosion. It is to be noted that in the present embodiment, the thickness dimension of the metal plate 5 is set to 1.5 mm, and the thickness dimension of the metal plate 6 is set to 1.0 mm, but the thickness dimensions of the metal plates 5, 6 are not limited to the dimensions of the embodiment.

Moreover, a water supply pipe 20 for supplying the water into the hot water storage tank 1 is attached so as to extend through an outer surface of the center of the bottom part 4, and one end of the pipe opens at the bottom part of the hot water storage tank 1. The other end of the water supply pipe 20 is connected to a water supply source such as city water via a pressure reduction valve or the like (not shown).

On the other hand, a hot water outflow pipe 22 for taking out the hot water produced in the hot water storage tank 1 is attached so as to extend through an outer surface of the center of the cap part 3, one end of the pipe opens at the upper part of the hot water storage tank 1, and the other end is connected to, for example, a tap of the city water or the like.

Moreover, in the vicinity of the inner surface of the tank main body 2 (in the vicinity of an inner wall of the metal plate 5), a cylindrical partition plate 8 is disposed with a space from the metal plate 5. As the partition plate 8 of the present embodiment, an insulating member such as a foaming material of a synthetic resin such as polystyrene or polyethylene, the foaming material nipped by fiber reinforcing plastics (FRP) or the foaming material nipped between stainless steel materials is formed into a cylindrical shape, and is arranged concentrically with the tank main body 2.

In consequence, the hot water storage tank 1 can be separated by the partition plate 8 into a space formed between the outer side of the partition plate 8 and the inner surface of the tank main body 2 and a space on the inner side of the cylindrical partition plate 8.

Moreover, a height dimension (a vertical dimension corresponding to an area where the partition plate is installed as shown in FIG. 2) of the partition plate 8 is formed to be larger than that of the tank main body 2, and the partition plate is arranged so that a lower end of the partition plate 8 is positioned below the lower end of the tank main body 2 in at least the hot water storage tank 1 and so that a predetermined gap is formed between the partition plate 8 and the lower bottom part 4.

The partition plate 8 is arranged so that an upper end of the plate has substantially the same position as that of the upper end of the tank main body 2 or a position slightly higher than that of the upper end of the tank main body 2. In consequence, a sufficient gap is secured between the partition plate 8 and the upper cap part 3. In FIG. 2, reference numeral 25 is a fixing member for fixing the upside of the partition plate 8, and 26 is a fixing member for fixing the downside of the partition plate 8. In the embodiment, two fixing members 25 and two fixing members 26 are used, respectively, and the partition plate 8 is fixed to the tank main body 2 via the fixing members 25, 26. It is to be noted that circulation of the water in the hot water storage tank 1 is not disturbed by the fixing members 25, 26.

Thus, the partition plate 8 is formed to be larger than the height dimension of the tank main body 2, the lower end of the partition plate 8 is disposed at a position lower than that of the lower end of the tank main body 2, and the upper end of the plate is disposed at substantially the same position as that of the upper end of the tank main body 2 or at a position slightly higher than that of the tank main body 2, whereby the tank main body 2 is separated by the partition plate 8 into a space formed between the outer side of the partition plate 8 and the inner surface of the tank main body 2 and a space on the inner side of the cylindrical partition plate 8. In consequence, the space formed between the outer side of the partition plate 8 and the inner surface of the tank main body 2 constituting the heat exchanger can be constituted as a hot water production area, and the space on the inner side of the partition plate 8 can be constituted as a cold water area.

To assemble the hot water storage tank 1 in the above constitution, first at one end and the other end of the metal plate 6, holes (corresponding to the refrigerant inlet 7A and the refrigerant outlet 7B) extending through the metal plate 6 are formed, respectively. Subsequently, the metal plates 5 and 6 are arranged so as to be superimposed on each other, and both the metal plates 5, 6 are spot-welded from one surface side (the side of the surface opposite to the surface where the metal plate 5 is positioned) of the metal plate 6. In consequence, both the metal plates 5, 6 are partially secured to form the secured portions Wi. Then, all peripheral edge portions of both the metal plates 5, 6 are seam-welded from the one surface side (the side of the surface opposite to the surface where the metal plate 5 is positioned) of the metal plate 6. In consequence, between both the metal plates 5 and 6, a space where all the peripheral edge portions are secured with the secured portions Wo is formed.

Subsequently, the metal plate 5 is processed into a cylindrical shape so as to be arranged on the inner side. In consequence, the tank main body 2 is formed. Afterward, a high-pressure liquid is injected from one hole (e.g., a hole corresponding to the refrigerant inlet 7A) formed at the metal plate 6. In consequence, non-secured portions other than the spot-welded secured portions Wi on the inner side of the secured portions Wo swell owing to the pressure of the liquid. In consequence, the heat exchanger is constituted in which the passage 7 closed except the refrigerant inlet 7A and the refrigerant outlet 7B is formed between the metal plates 5 and 6 and in which the inside of the passage 7 is a refrigerant passage.

Then, the cylindrically processed partition plate 8 is attached on the inner side of the tank main body 2. At this time, the lower end of the partition plate 8 is positioned at the position lower than the lower end of the tank main body 2 in at least the hot water storage tank 1 so that a predetermined gap is formed between the partition plate 8 and the lower bottom part 4, and the downside of the partition plate 8 is fixed by the fixing members 26.

Similarly, the upper end of the partition plate 8 is positioned at substantially the same position as the upper end of the tank main body 2 or the position slightly higher than the upper end of the tank main body 2 in the hot water storage tank 1, and the upside of the partition plate 8 is fixed by the fixing members 25.

Subsequently, the cap part 3 provided with a through hole (not shown) to be connected to the hot water outflow pipe 22 around the center thereof is attached to an opening of the upper end of the tank main body 2, and all peripheral edges of a connecting portion are secured by welding (seam welding or the like). Similarly, the bottom part 4 provided with a through hole (not shown) to be connected to the water supply pipe 20 at the center thereof is attached to an opening of the other end of the tank main body 2, and all peripheral edges of a connecting portion are secured by the welding (the seam welding or the like).

Then, the refrigerant introduction tube 12 of the compressor 10 is connected and secured to the refrigerant inlet 7A of the tank main body 2, and the refrigerant pipe 13 is connected and secured to the refrigerant outlet 7B. Furthermore, the hot water outflow pipe 22 is connected and secured to the through hole of the cap part 3, and the water supply pipe 20 is connected and secured to the through hole of the bottom part 4. In consequence, the hot water storage tank 1 of the embodiment is assembled.

An operation of the heat pump device including the hot water storage tank 1 having the above constitution of the present embodiment will be described. The compressor 10 is started to compress the refrigerant, and the carbon dioxide refrigerant having high temperature and high pressure is discharged to the refrigerant discharge tube 12. At this time, the discharged refrigerant is compressed into a supercritical state.

Figure 6:
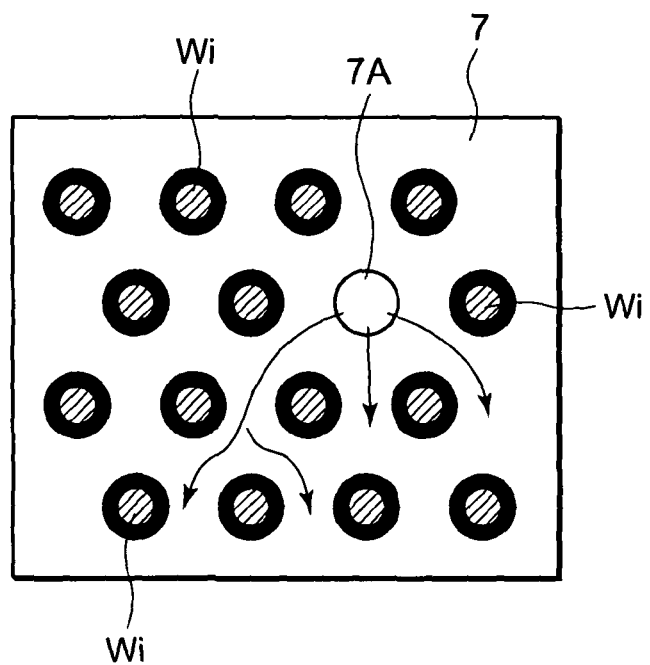
FIG. 6 is a diagram showing a flow of a refrigerant around a refrigerant inlet formed at the tank main body.

The refrigerant discharged to the refrigerant discharge tube 12 flows from the refrigerant inlet 7A into the hot water storage tank 1 (into the refrigerant passage 7 in the tank main body 2). The refrigerant which has flowed from the refrigerant inlet 7A into the refrigerant passage 7 is dispersed as shown in FIG. 6 to flow through the passage 7 formed among the secured portions Wi. In this process, the refrigerant releases heat to the water in the hot water storage tank 1. In the hot water storage tank 1 of the present invention, since the refrigerant flows through the refrigerant passage 7 formed between two metal plates 5 and 6 as described above, a temperature distribution of a thermally conductive surface is remarkably uniform. That is, the heat of the refrigerant which flows through the passage 7 can evenly be transmitted to the water in the hot water storage tank via the metal plate 5. In consequence, a heat exchange performance between the refrigerant and the water improves, and the hot water can highly efficiently be produced.

Moreover, the refrigerant flows from the refrigerant inlet 7A formed on the upside of the hot water storage tank 1 into the passage 7, and flows downwards. On the other hand, the water in the hot water storage tank 1 enters the hot water storage tank 1 from an opening of the water supply pipe formed at the lower part, and flows upwards. Therefore, the refrigerant and the water in the hot water storage tank 1 performs the heat exchange while flowing in a counter flow. The flows of the refrigerant and the water form the counter flow, so that the water in the hot water storage tank 1 can efficiently be heated.

Especially, in a case where the carbon dioxide refrigerant is used as in the present embodiment, in the hot water storage tank 1, the refrigerant does not condense, and releases the heat while maintaining the supercritical state, so that a temperature of the refrigerant drops. Therefore, the temperature of the refrigerant is highest around the refrigerant inlet 7A formed on the upside of the hot water storage tank 1, the temperature of the refrigerant gradually drops while the refrigerant flows downwards from the inlet to release the heat, and the temperature of the refrigerant becomes lowest around the refrigerant outlet 7B. Therefore, the refrigerant and the water are passed so as to form the counter flows, whereby the low-temperature refrigerant and the low-temperature water perform the heat exchange on the downside of the hot water storage tank 1, and the high-temperature refrigerant and the comparatively high-temperature hot water perform the heat exchange on the upside of the hot water storage tank 1 so that the water can be heated to a higher temperature. Therefore, the refrigerant and the water can highly efficiently perform the heat exchange.

Furthermore, as in the embodiment, the cylindrical partition plate 8 is concentrically arranged with a gap on the inner side of the tank main body 2, so that the partition plate 8 can separate the space in the tank main body 2 into the hot water production area (corresponding to an area where heating is performed in FIG. 2) formed between the outer side of the partition plate 8 and the inner surface of the tank main body 2 and the cold water area on the inner side of the cylindrical partition plate 8.

In consequence, the water (cold water) supplied from the lower part of the hot water storage tank 1 is heated in the hot water production area to produce the high-temperature hot water, and the produced high-temperature hot water can effectively be stored in an upper part of the hot water storage tank 1. That is, in the hot water storage tank 1 of the present embodiment, since the passage 7 where the refrigerant flows is constituted at the wall surface of the tank main body 2, the center of the hot water storage tank 1 in an axial center direction is an area which comes farthest from the refrigerant passage 7 and which is not easily heated by the refrigerant. Especially, with regard to the refrigerant which operates (releases the heat) in the supercritical area, for example, the carbon dioxide refrigerant, it is important that the hot water raised to the high temperature in the process of the heat exchange is not mixed with the cold water. Therefore, in a case where the partition plate 8 does not separate the inside of the hot water storage tank 1, the heat of the water around the wall surface of the tank main body 2 heated by the refrigerant is taken by water closer to the center than to the heated water, so that the high-temperature hot water cannot effectively be stored in the upper part of the hot water storage tank 1. However, the partition plate 8 is provided as in the present invention, whereby the heat of the hot water produced in the hot water production area on the outer side of the partition plate 8 is not taken by the cold water around the center farthest from the passage 7 in the hot water storage tank 1 through which the refrigerant flows, and the hot water can be passed upwards while retaining the high temperature.

Furthermore, as in the embodiment, the partition plate 8 is formed to be larger than the height dimension of the tank main body 2, the lower end of the partition plate 8 is provided at the position lower than the lower end of the tank main body 2, and the upper end of the partition plate is provided at substantially the same position as the upper end of the tank main body 2 or a position slightly higher than the upper end of the tank main body 2, so that a disadvantage that the heat is taken by the cold water supplied from the lower part can be prevented. Especially, since the high-temperature hot water circulates upwards from the lower part owing to natural convection using a density ratio with respect to the cold water as a driving force, in general, a high-temperature layer is formed in the upper part of the hot water storage tank 1, and temperature layers are formed so that the temperature drops toward the lower part. However, the partition plate 8 is provided as described above, so that such produced layers are not impaired as much as possible, the hot water can be produced in the hot water storage tank 1, and the high-temperature hot water can be stored in the upper part.

On the other hand, the refrigerant which has flows through the refrigerant passage 7 to release the heat exits from the refrigerant outlet 7B and flows into the expansion valve 14 so that the pressure of the refrigerant is reduced. At the inlet of the expansion valve 14, the refrigerant still has the supercritical state. Then, the refrigerant is liquefied in the process of the pressure reduction at the expansion valve 14, brought into a gas-liquid two-phase state, and flows into the evaporator 16 in this state. In the evaporator, the refrigerant takes the heat from the air (outside air) blown by the fan 16F, evaporates, and is then sucked from the refrigerant introduction tube 11 into the compressor 10.

As described above in detail, according to the present invention, since the hot water storage tank 1 performs a function of the heat exchanger in which the refrigerant releases the heat, the water in the hot water storage tank 1 can be heated substantially directly by the refrigerant flowing along the wall surface, and stored. In consequence, the heat loss can be eliminated. Moreover, special water feeding means such as the water feeding pump in a case where the heat exchanger is provided outside the hot water storage tank 1 is not required, and the device cost and the power consumption can be reduced. Furthermore, since the water feeding means is not required and the hot water storage tank 1 itself performs the function of the heat exchanger, compactness of the device can be achieved. In general, according to the hot water storage tank of the present invention, energy saving, space saving and cost reduction can be realized.

It is to be noted that in the above embodiment, the partition plate 8 is constituted of the insulating member, but the partition plate 8 is not limited to the insulating member as in the present embodiment. There is not any restriction on the partition plate as long as the partition plate can separate the space formed between the outer side of the partition plate 8 and the inner surface of the tank main body 2 and the space on the inner side of the cylindrical partition plate 8. Even when the plate is constituted of a stainless steel plate, the present invention is effective.

Moreover, in the embodiment, peripheral wall portions of the metal plates 5, 6 are secured by the seam welding, and the inner portions of the metal plates are partially secured by spot welding, but the securing method is not limited to the present embodiment, another securing method such as a method of securing the metal plates 5, 6 by brazing may be used, and still another method is effective.

Figure 7:
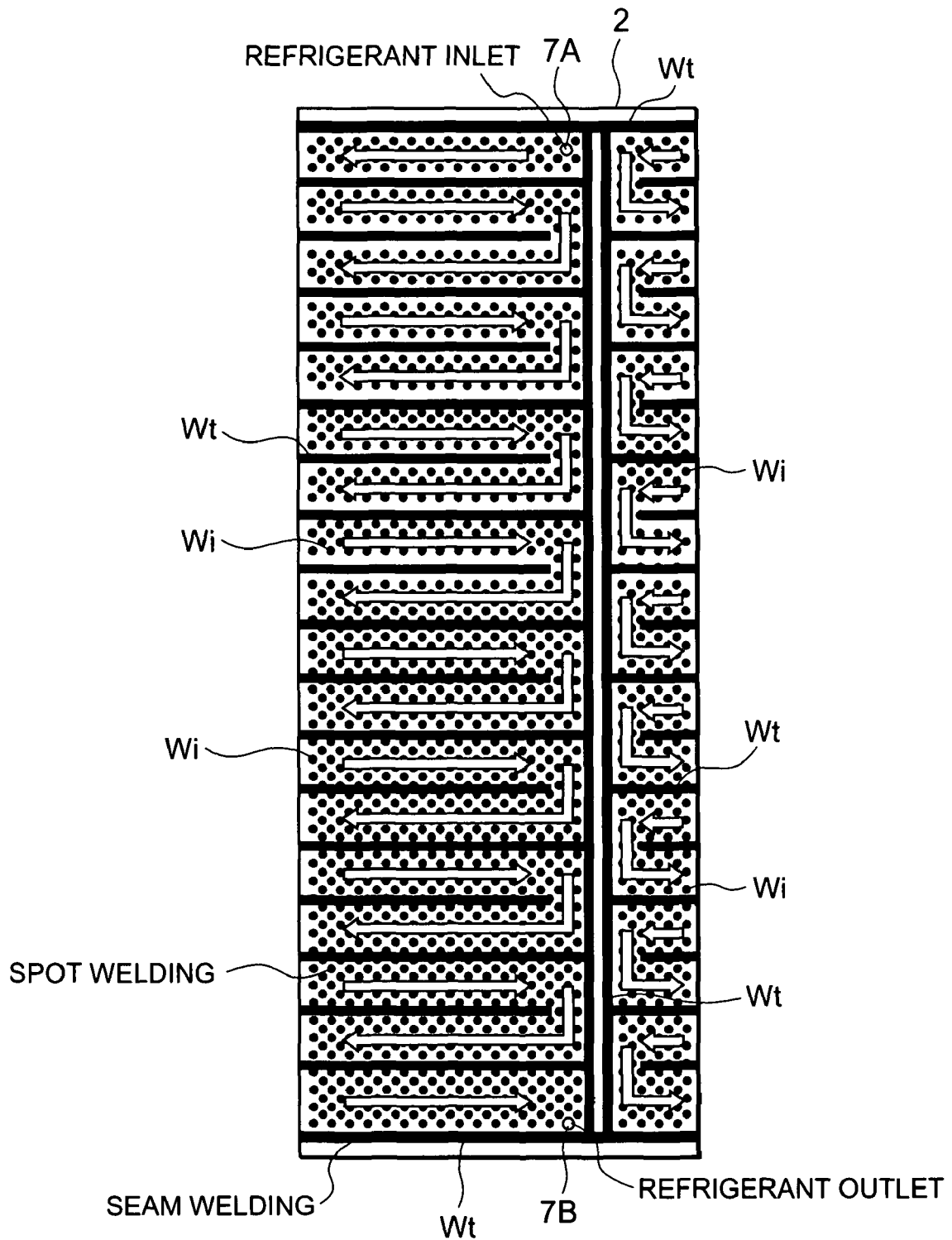
FIG. 7 is a side view of a tank main body according to another embodiment.
Figure 8:
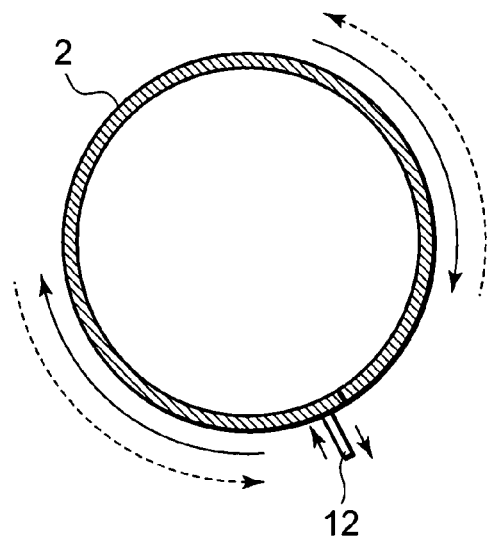
FIG. 8 is a plan view of the tank main body of FIG. 7.
Figure 9:
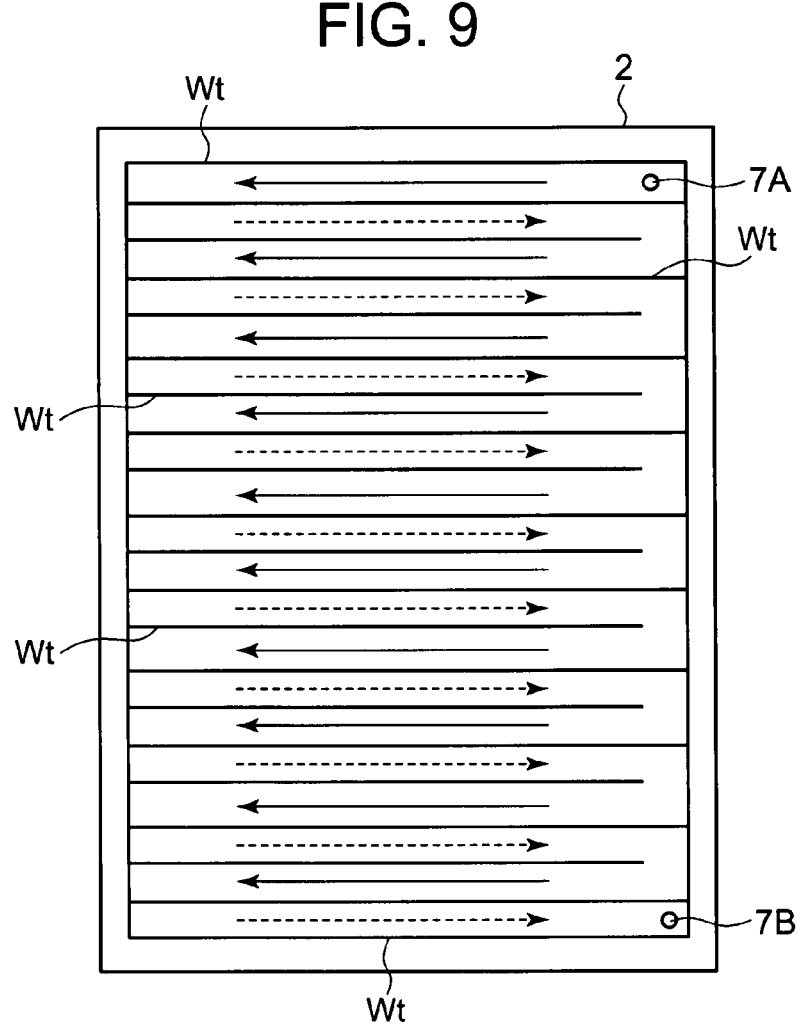
FIG. 9 is a developed diagram schematically showing the tank main body of FIG. 7.

Furthermore, in Embodiment 1, the only peripheral wall portions of the metal plates 5, 6 are secured by the seam welding, and the refrigerant which has flowed from the refrigerant inlet 7A into the refrigerant passage 7 is dispersed in the course. However, as shown in FIGS. 7 to 9, the metal plates 5, 6 may be subjected to the seam welding in parallel over a vertical direction to form the passage 7 so that the refrigerant flows in a meandering manner. It is to be noted that in FIGS. 7 to 9, Wt shows seam-welded secured portions, and arrows indicate a flow of the refrigerant which flows in the meandering manner from the inlet 7A toward the outlet 7B.

Embodiment 2

Figure 10:
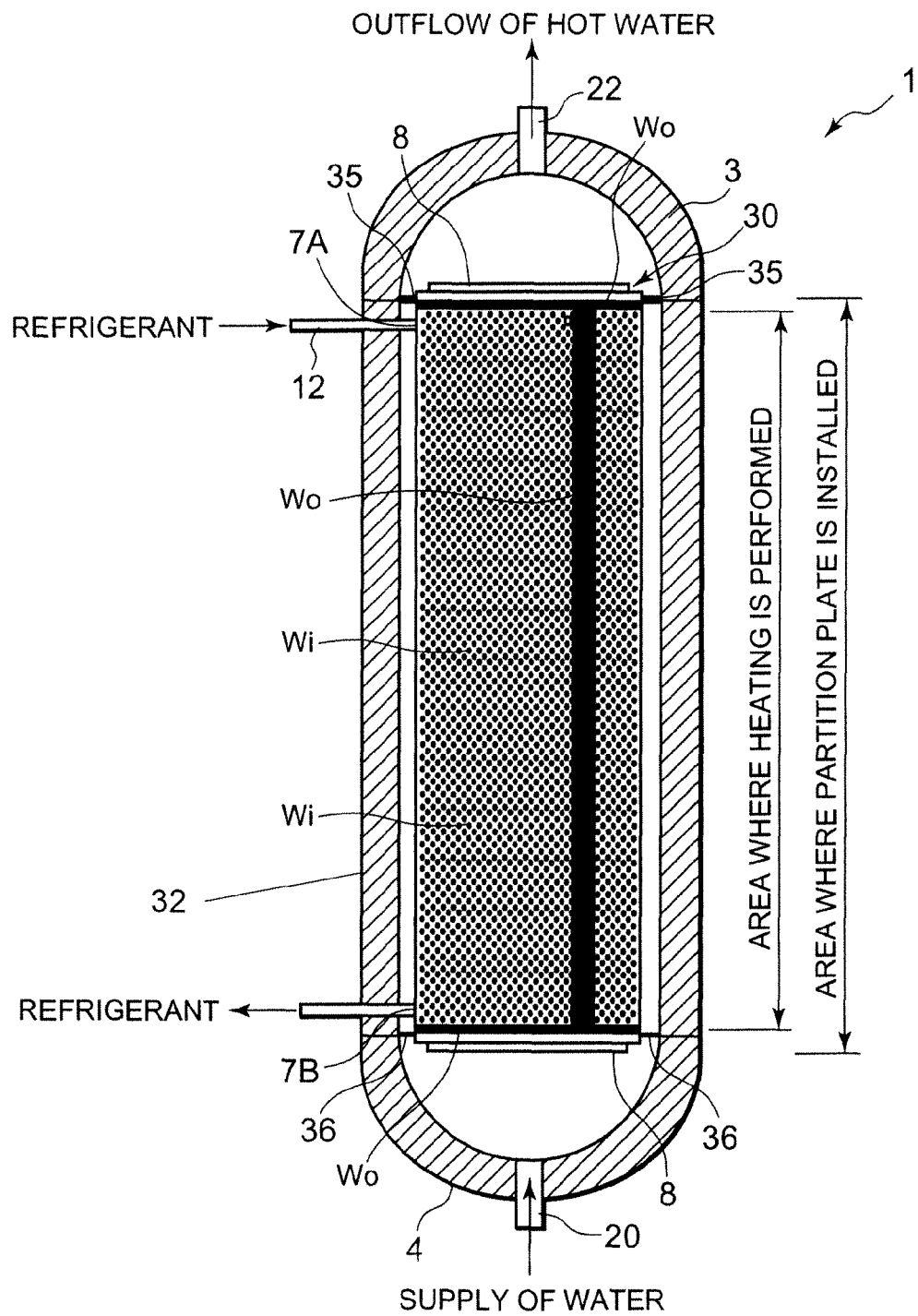
FIG. 10 is an explanatory view of a hot water storage tank according to still another embodiment of the present invention.

In Embodiment 1 described above, a tank main body 2 of a hot water storage tank 1 is a heat exchanger, but as shown in FIG. 10, the heat exchanger may be provided in the hot water storage tank 1. FIG. 10 shows a side view of the hot water storage tank 1 in a case where a cylindrical heat exchanger 30 is installed in the hot water storage tank 1. For the sake of description, in FIG. 1, the hot water storage tank 1 is shown in a sectional view, and the heat exchanger 30 and a partition plate 8 are shown in a side view. It is to be noted that in FIG. 10, components denoted with the same reference numerals as those of FIGS. 1 to 9 produce the same effects or similar effects, and description thereof is omitted. In this case, in the heat exchanger 30, shape, since structure and forming method of a tank main body are substantially the same as those of the tank main body 2 of Embodiment 1 described above, here specific description is omitted.

Since the heat exchanger 30 of the embodiment is submerged into the water in the hot water storage tank 1, it is preferable to use a material having an excellent resistance to corrosion in both the metal plates 5, 6. In this embodiment, a tank main body 32 of the hot water storage tank 1 is formed by processing one metal plate into a cylindrical shape, a hole is formed on the upside of a side surface, and a refrigerant introduction tube 12 of a compressor 10 is passed through the hole and connected to a refrigerant inlet 7A of the heat exchanger 30 in the hot water storage tank 1. Moreover, a hole is similarly formed on the downside of a side surface, and a refrigerant pipe 13 is passed through the hole and connected to a refrigerant outlet 7B of the heat exchanger 30 in the hot water storage tank 1.

In a case where the heat exchanger 30 is arranged in the hot water storage tank 1 in this manner, it is assumed that the upside and the downside of an outer surface of the heat exchanger 30 are fixed to the tank main body 32 via fixing members 35, 36 (two upper fixing members and two lower fixing members are used, respectively, in the embodiment). It is to be noted that these fixing members 35, 36 do not disturb circulation of water in the hot water storage tank 1 in the same manner as in the fixing members 25, 26 of Embodiment 1. An outer periphery of the heat exchanger comes close to a wall surface (an inner surface) of the tank main body 32, and it is preferable to set a gap between the inner surface of the tank main body 32 and a metal plate 6 positioned outside the heat exchanger to 30 mm or less. In consequence, effects similar to those of Embodiment 1 described above can be obtained.

Furthermore, even in the present embodiment, the partition plate 8 is provided at an inner side surface of the heat exchanger 30, so that a space where the heat exchanger outside the partition plate 8 is present as a hot water production area and a cold water area on the inner side of the partition plate 8 can be separated. In consequence, in the same manner as in Embodiment 1, cold water supplied from a lower part of the hot water storage tank 1 is heated in the hot water production area, to produce high-temperature hot water, and the produced high-temperature hot water can effectively be stored in an upper part of the hot water storage tank 1.

Figure 17:
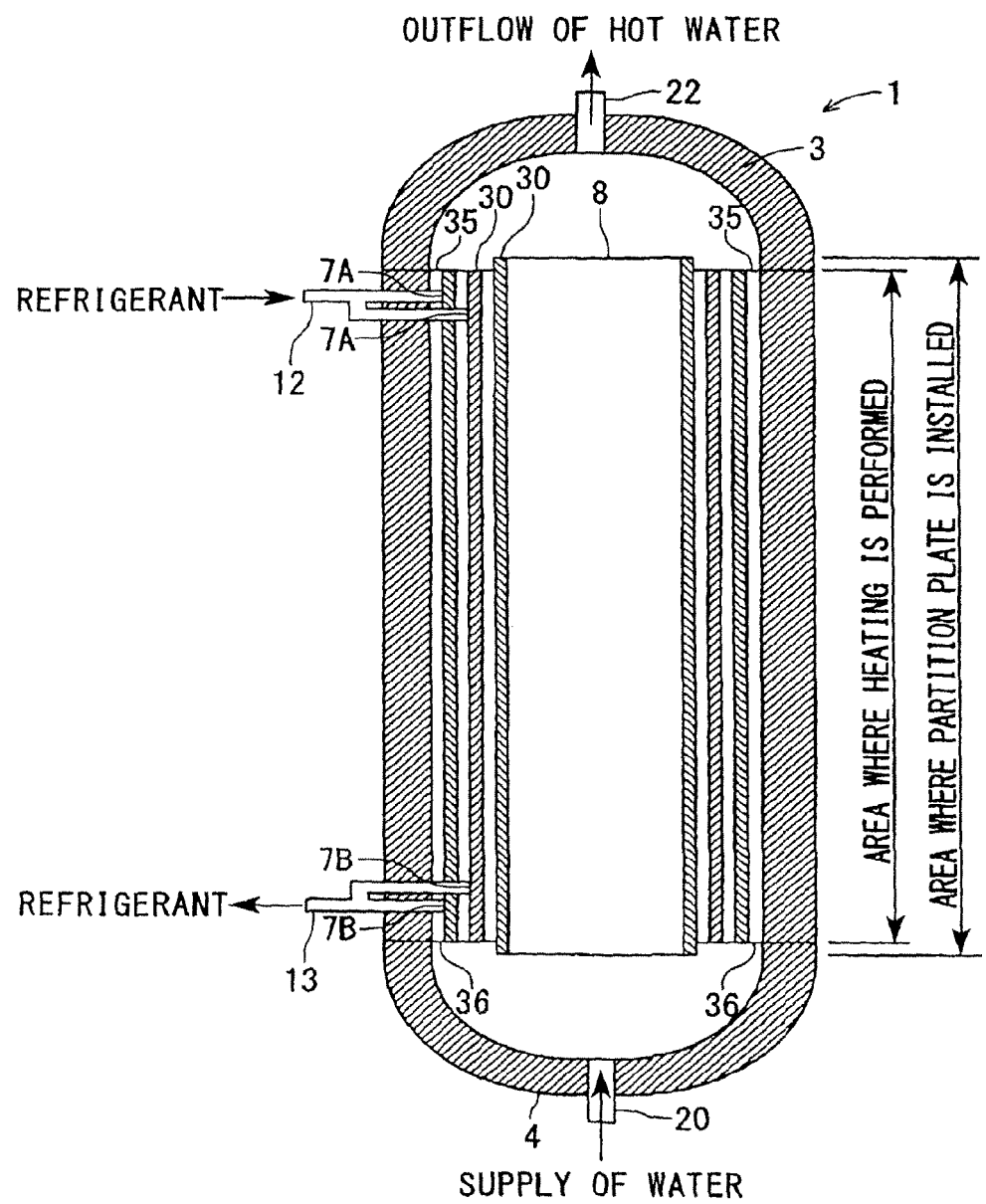
FIG. 17 is a vertically sectional view of the hot water storage tank according to another embodiment.

In the present embodiment, it is assumed that one heat exchanger 30 is provided in the hot water storage tank 1, but the present invention is not limited to this embodiment, and a plurality of heat exchangers 30 may concentrically be arranged in the hot water storage tank 1 as shown in FIG. 17. It is to be noted that since a shape and a constitution of the heat exchanger are similar to those of the above heat exchanger, description thereof is omitted. Thus, when the plurality of heat exchangers 30 are concentrically arranged in the hot water storage tank 1, the hot water can more efficiently be produced, and the produced high-temperature hot water can be stored in the upper part of the hot water storage tank. In consequence, without impairing production layers of the hot water and the cold water, the hot water can be produced and stored.

It is to be noted that in a case where the heat exchanger is provided in the hot water storage tank 1 as in Embodiment 2, the heat exchanger is not limited to a cylindrically formed exchanger, and a planar exchanger may be submerged as it is in the water in the hot water storage tank 1.

Embodiment 3

Next, another embodiment of the heating tank of the present invention will be described. In the above embodiments (Embodiments 1 and 2), a case where the heating tank is used as a hot water storage tank has been described, but the heating tank of the present invention is not limited to the hot water storage tank which produces hot water, and the heating tank may be used as a tank for fermentation and brewing of foods such as rice malt and soybean paste, a tank for drying and condensing the food, a treatment tank for treating raw garbage, a tank for drying a solvent or water or the like.

Figure 11:
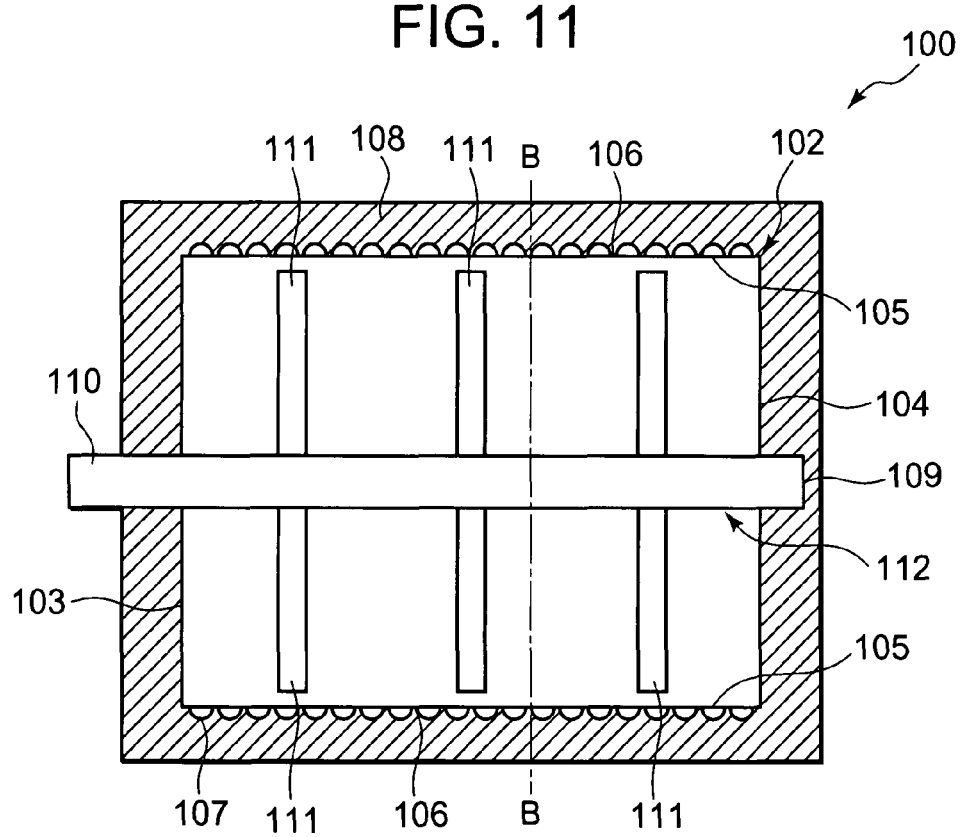
FIG. 11 is a vertically sectional view of a treatment tank according to another embodiment of the heating tank of the present invention.
Figure 12:
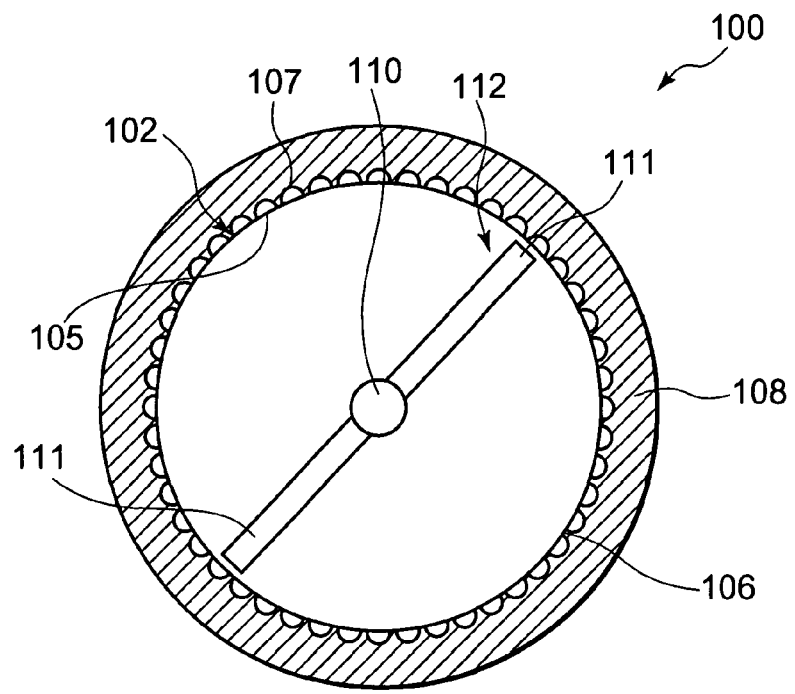
FIG. 12 is a sectional view cut along the B-B line of FIG. 11.
Figure 13:
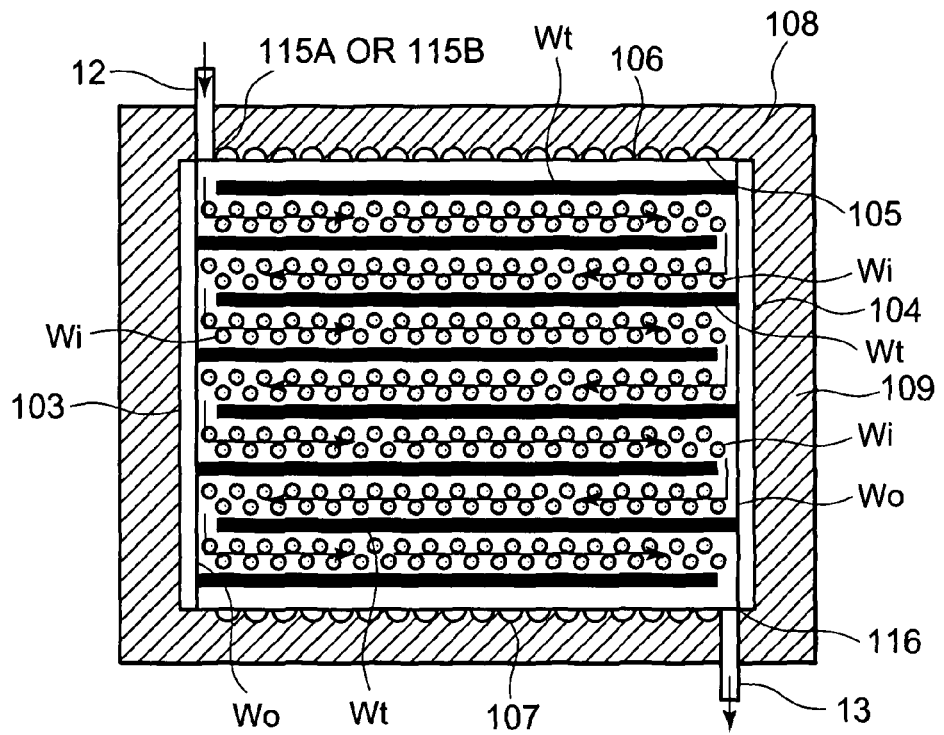
FIG. 13 is a diagram showing a flow of a refrigerant which flows through a tank main body 102 of the treatment tank of FIG. 11.
Figure 14:
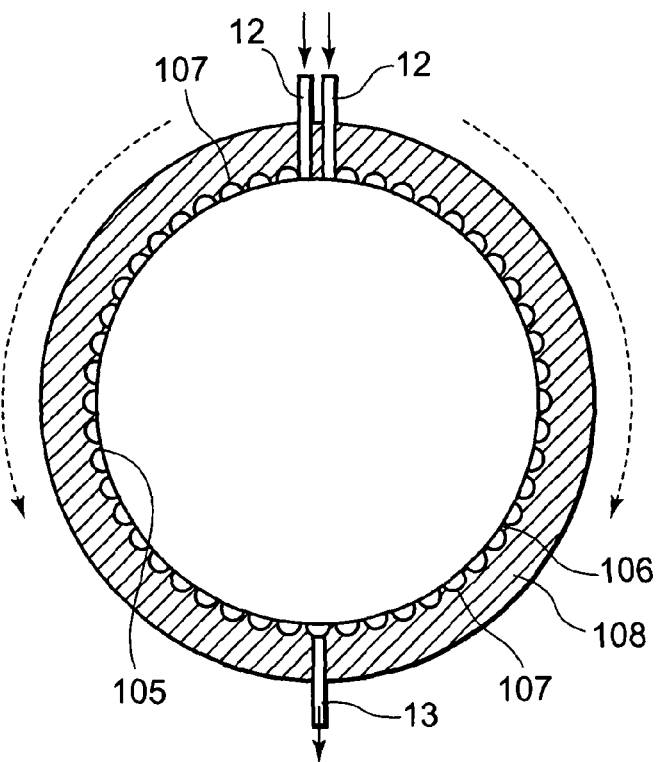
FIG. 14 is another diagram showing the flow of the refrigerant which flows through the tank main body 102 of the treatment tank of FIG. 11.

Here, as one example of the above tank, for example, a case where the heating tank of the present invention is used as the treatment tank for drying or condensing the food, or treating the raw garbage or the like will be described in detail with reference to FIGS. 11 to 14. FIG. 11 is a vertically sectional view of a treatment tank 100 according to the present embodiment, FIG. 12 is a sectional view cut along the B-B line of FIG. 11, and FIGS. 13 and 14 are diagrams showing a flow of a refrigerant which flows through a tank main body 102 of the treatment tank 100. It is to be noted that in FIGS. 11 and 14, components denoted with the same reference numerals as those of FIGS. 1 to 10 produce similar effects or functions, and description thereof is omitted.

The treatment tank 100 of the present embodiment is a heating tank having a function of a heat exchanger which release heat of a circulated refrigerant of a heat pump, and constitutes a refrigerant circuit together with a compressor 10, an expansion valve (a pressure reduction unit) 14 and an evaporator 16 in the same manner as in Example 1. It is also assumed that as a refrigerant, carbon dioxide ($CO_2$) is similarly used, a supercritical state is obtained on a high pressure side of the refrigerant circuit, the refrigerant does not condense, the temperature drops, and the supercritical state changes to a gas-liquid two-phase state by pressure reduction in the expansion valve 14. It is to be noted that since a constitution of the refrigerant circuit is similar to that shown in FIG. 1 of Embodiment 1, specific description is omitted here.

Then, a high-temperature high-pressure gas refrigerant ($CO_2$) compressed by a compression element (not shown) of the compressor 10 performs heat exchange between the refrigerant and a target to be heated (e.g., the raw garbage or the like) stored in the treatment tank 100, to release heat in the tank. At this time, the target to be heated stored in the treatment tank 100 is heated at the high temperature by such heat release of the refrigerant.

On the other hand, the refrigerant which has released the heat in the treatment tank 100 flows into the expansion valve 14 and is pressed, then liquefied in the process of the pressure reduction, and then achieves a gas-liquid two-phase state. Then, the refrigerant flows into the evaporator 16, takes heat from the air (outside air) blown by a fan 16F, and evaporates. The refrigerant which has exited from the evaporator 16 repeats a supercritical freezing cycle in which the refrigerant is sucked into the compressor 10 from a refrigerant introduction tube 11.

Next, the treatment tank 100 of the present embodiment will be described in detail. The treatment tank 100 is constituted of a laterally long cylindrical tank main body 102 having both ends sealed with cylindrical cap members 103, 104, and the whole outer peripheral surface of this treatment tank 100 is covered with an insulating material 108 constituted of a foaming material of a synthetic resin such as polystyrene, polyethylene or urethane, glass wool or the like.

The tank main body 102 of the present embodiment is constituted of a heat exchanger in the same manner as in Embodiment 1. Specifically, the tank main body 102 is constituted by a heat exchanger in which a wall surface is partially secured to peripheral edge portions and inner portions of two metal plates 105, 106 and in which non-secured portions swell to constitute a refrigerant passage 107 (a refrigerant circulating section) closed except an inlet (refrigerant ports 115A, 115B in the present embodiment) and an outlet (a refrigerant port 116 in the pressure). In FIG. 13, Wo indicates secured portions in which peripheral edge portions of the two metal plates 105, 106 are welded, Wt indicates secured portions welded in parallel with a vertical direction on the inner side of the secured portions, and Wi indicates secured portions in which inner portions of the secured portions Wo are partially secured, respectively. In the present embodiment, a passage 107 is welded in parallel with the vertical direction on the inner side of the secured portions Wo of the peripheral edge portions, and formed so that the refrigerant flows in a meandering manner.

Then, the secured portions Wi are formed by spot welding of the metal plates 106 and 105 from one surface side (the side of the surface opposite to the side where the metal plate 105 is positioned) of the metal plate 106. The secured portions Wo and Wt are formed by seam welding of the metal plates 106 and 105 from the one surface side (the side of the surface opposite to the side where the metal plate 105 is positioned) of the metal plate 106.

In a wall surface of the tank main body 102 of the embodiment, in the same manner as in Embodiment 1 described above, a thickness dimension of the one metal plate 105 arranged on the inner side is constituted to be larger than that of the other metal plate 106 arranged on the outer side. Therefore, one surface (an inner surface) of the metal plate 105 comes in contact with a target to be heated stored in the treatment tank 100.

The thickness dimension of the metal plate 105 arranged on the inner side is set to be larger than that of the metal plate 106 arranged on the outer side in this manner, whereby if a high pressure is generated in the passage 107 formed between both the metal plates 105 and 106, the outer metal plate 106 completely blocked from the contact with the target to be heated in the treatment tank 100 is plastically deformed, and broken. Therefore, it is possible to avoid in advance a disadvantage that the metal plate 105 which is arranged on the inner side and which comes in contact with the target to be heated in the treatment tank 100 is deformed and broken. In consequence, safety and reliability of the treatment tank 100 can be improved. In addition, it is preferable that the metal plate 105 arranged on the inner side is constituted of at least a material having an excellent resistance to corrosion.

Moreover, in the treatment tank 100, a stirring blade 112 is attached which is constituted of a rotary shaft 110 extending in an axial center direction of the tank main body 102 and a plurality of wing members 111 each having one end attached to the rotary shaft 110. One end of the stirring blade 112 extends through the cap member 103 and the insulating material 108, and is attached to a driving unit (not shown), and the other end of the stirring blade extends through the cylindrical member 104, and is rotatably held in a holding portion 109 formed in the insulating material 108. Then, it is constituted that when the rotary shaft 110 is driven by the driving unit, a plurality of stirring blades 112 attached to the rotary shaft 110 rotate in the treatment tank 100 so as to stir the target to be heated stored in the treatment tank 100.

To assemble the treatment tank 100 in the above constitution, first at one end and the other end of the metal plate 106 on one side (i.e., a cap member 103 side), holes (corresponding to the refrigerant ports 115A and 115B) extending through the metal plate 106 are formed, respectively, and a hole (the refrigerant port 116) extending through the metal plate 106 is similarly formed on the other side (i.e., a cap member 104 side) of the metal plate 106 between both the holes. Subsequently, the metal plates 105 and 106 are arranged so as to be superimposed on each other, and both the metal plates 105, 106 are spot-welded from one surface side (the side of the surface opposite to the surface where the metal plate 105 is positioned) of the metal plate 106. In consequence, both the metal plates 105, 106 are partially secured to form the secured portions Wi. Then, all peripheral edge portions and inner portions of both the metal plates 105, 106 are seam-welded in parallel with the vertical direction from the one surface side (the side of the surface opposite to the surface where the metal plate 105 is positioned) of the metal plate 106. In consequence, between both the metal plates 105 and 106, all the peripheral edge portions are secured with the secured portions Wo, and a meandering space (the passage 107) is formed by the secured portions Wt.

Subsequently, the metal plate 105 is processed into a cylindrical shape so as to be arranged on the inner side. In consequence, the tank main body 102 is formed. Afterward, a high-pressure liquid is injected from one hole (e.g., one or both of the refrigerant ports 115A, 115B) formed at the metal plate 106. In consequence, non-secured portions other than the secured portions Wo, the secured portions Wt on the inner side of the secured portions Wo and the spot-welded secured portions Wi swell owing to the pressure of the liquid. In consequence, the heat exchanger is constituted in which the passage 107 closed except the refrigerant ports 115A, 115B and the refrigerant port 116 is formed between the metal plates 105 and 106 and in which the inside of the passage 107 is a refrigerant passage.

At this time, as shown in FIG. 14, in a case where the tank main body 102 is arranged so that the refrigerant port 116 is disposed on the downside, that is, the secured portions Wo having one end and the other end welded by the seam welding are disposed on the upside, the refrigerant ports 115A, 115B on the upside are used as refrigerant inlets, and the refrigerant port 116 on the downside is used as a refrigerant outlet. Therefore, the treatment tank 100 of the present embodiment is provided with two refrigerant inlets and one refrigerant outlet. In this case, the refrigerant inlets 115A, 115B are connected to a refrigerant discharge tube 12 of the compressor 10. Specifically, one end of the refrigerant discharge tube 12 is branched into two ends, one branched refrigerant discharge tube 12 is connected to the refrigerant inlet 115A, and the other branched refrigerant discharge tube 12 is connected to the refrigerant inlet 115B. The refrigerant outlet 116 is connected to a refrigerant pipe 13 which reaches the expansion valve 14.

Subsequently, the cap members 103, 104 are attached to openings at both ends of the tank main body 102 to weld and connect outer peripheral edges of the cap members 103, 104 to opening edges of the tank main body 102, respectively, whereby the treatment tank 100 of the present embodiment is assembled. It is to be noted that introducing and extracting of the target to be heated with respect to the present treatment tank 100 are performed via an outlet/inlet (not shown) formed at, for example, the disc-like members 103, 104 or a portion of the tank main body 102, and it is assumed that this outlet/inlet is closed with an openable lid member.

An operation of a heat pump device including the treatment tank 100 of the present embodiment having the above constitution will be described. The compressor 10 is started to compress the refrigerant, and the carbon dioxide refrigerant having high temperature and high pressure is discharged to the refrigerant discharge tube 12. At this time, the discharged refrigerant is compressed into a supercritical state.

The refrigerant discharged to the refrigerant discharge tube 12 is branched into two flows to flow from the refrigerant inlets 115A, 115B into the treatment tank 100 (into the passage 107 in the tank main body 102), respectively. The refrigerant which has flowed from the refrigerant inlet 115A into the refrigerant passage 107 flows downwards from the refrigerant inlet 115A as shown by arrows of FIGS. 13 and 14, and the refrigerant which has flowed from the refrigerant inlet 115B into the refrigerant passage 107 similarly flows from the refrigerant inlet 115B in a direction shown by arrows in FIG. 13, and releases heat to the target to be heated in the treatment tank 100 in this process. In the treatment tank 100 of the present invention, since the refrigerant flows through the refrigerant passage 107 formed between two metal plates 105 and 106 as described above, a temperature distribution of a thermally conductive surface is remarkably uniform. That is, the heat of the refrigerant which flows through the passage 107 can evenly be transmitted to the target to be heated in the heating tank via the metal plate 105. In consequence, a heat exchange performance between the refrigerant and the target to be heated improves, and the target to be heated can highly efficiently be heated.

Especially, in a case where as the refrigerant, the carbon dioxide refrigerant is used which does not condense by the heat release in the treatment tank 100 and which maintains the supercritical state as in the present embodiment, as in the present embodiment, the refrigerant which has flows from the refrigerant inlets 115A, 115B into the passage 107 formed in the treatment tank 100 is passed downwards from above in a meandering manner, whereby the refrigerant and the target to be heated stored in the tank performs the heat exchange, and a refrigerant temperature in the refrigerant outlet 116 can sufficiently be lowered by the heat exchange.

On the other hand, the refrigerant which has flowed through the refrigerant passage 107 to release the heat exists from the refrigerant outlet 116, and flows into the expansion valve 14 so that the pressure of the refrigerant is reduced. At the inlet of the expansion valve 14, the refrigerant still has the supercritical state. Then, in the process of the pressure reduction in the expansion valve 14, the refrigerant is liquefied, obtains a gas-liquid two-phase state, and flows into the evaporator 16 in this state. In the evaporator, the refrigerant takes heat from air (outside air) blown with the fan 16F, evaporates, and is then sucked from the refrigerant introduction tube 11 into the compressor 10.

As described above in detail, according to the present invention, the heating tank 100 performs a function of a heat exchanger in which the refrigerant releases the heat, and the target to be heated in the heating tank 100 can substantially directly be heated by the refrigerant flowing along the wall surface, and stored. In consequence, heat loss can be eliminated.

It is to be noted that in the present embodiment, as shown in FIG. 14, the tank main body 102 is arranged so that the refrigerant port 116 is disposed on the downside, but the tank main body 102 may be arranged so that the refrigerant port 116 is disposed on the upside. In this case, the refrigerant port 116 on the upside is used as a refrigerant inlet, and the refrigerant ports 115A, 115B on the downside are used as refrigerant outlets. In the present embodiment, the treatment tank 100 is of a laterally disposed type, but the present invention is not limited to this embodiment, and the tank may be of a vertically disposed type. In this case, the treatment tank 100 is constituted so that with the progress of a heating treatment, the target to be heated moves downwards, whereby the target to be heated immediately stored in the treatment tank 100 and the target to be heated progressively subjected to the heating treatment can efficiently be sorted.

Furthermore, a shape of the stirring blade 112 which stirs the target to be heated in the treatment tank 100 is not limited to the shape of that in the present embodiment shown in FIGS. 11 and 12, and another shape may be used. Without disposing any stirring blade 112, the treatment tank 100 itself may rotatably be constituted.

Figure 15:
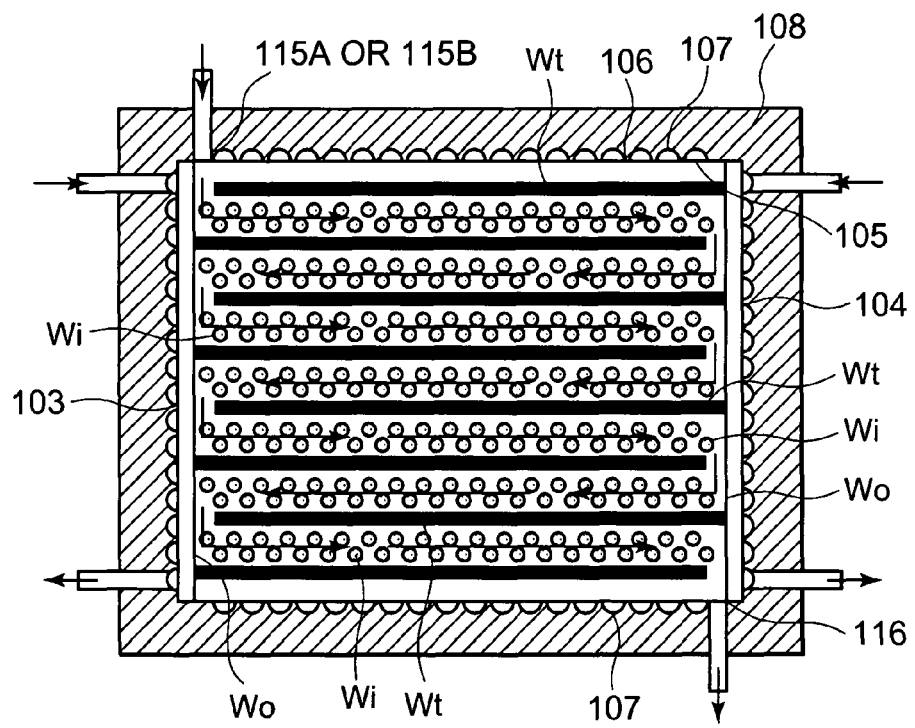
FIG. 15 is a diagram showing a flow of a refrigerant in a treatment tank of another embodiment.
Figure 16:
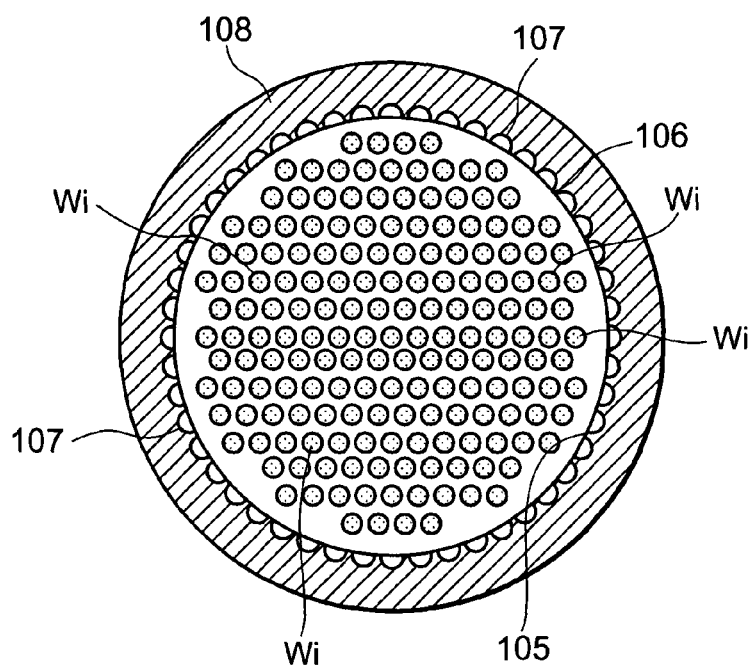
FIG. 16 is a diagram showing a cap member of the treatment tank shown in FIG. 15.

In addition, in the present embodiment, the tank main body 102 of the treatment tank 100 is constituted as the heat exchanger, but as shown in, for example, FIGS. 15 and 16, cap members 103, 104 which closes both ends of a tank main body 102 may be used as heat exchangers. That is, each of the cap members 103, 104 is constituted of two metal plates in the same manner as in the tank main body 102, peripheral edge portions and inner portions of the metal plate are secured, and non-secured portions swell to constitute a refrigerant passage (a refrigerant circulating section) closed except an inlet and an outlet. Even this constitution is effective. In this case, a high-temperature high-pressure refrigerant compressed by a compressor 10 is branched into four flows. As shown by arrows in FIG. 15, one refrigerant flow is passed from a refrigerant inlet 115A through a refrigerant passage 107 formed at the tank main body 102, another refrigerant flow is passed from a refrigerant inlet 115B through the refrigerant passage 107 formed at the tank main body 102, a further refrigerant flow is passed through a refrigerant passage formed at the cap member 103, and a still further refrigerant flow is passed through a refrigerant passage formed at the cap member 104. Furthermore, it is constituted that the refrigerant performs heat exchange between the refrigerant and a target to be heated in a treatment tank 100 while flowing through the refrigerant passages, to release heat, exits from the treatment tank 100 and then joins another refrigerant at a refrigerant pipe 13. In such a constitution, the target to be heated in the treatment tank 100 is heated from the whole peripheral surface of the treatment tank 100.

What is claimed is:

1. A hot water storage tank which is heated by a circulated refrigerant of a heat pump to produce hot water therein, the hot water storage tank comprising a heat exchanger provided in the hot water storage tank, the heat exchanger having a wall, wherein:

the wall includes a cylindrical wall body, a top cover and a bottom cover, the cylindrical wall body includes two metal plates having an inner metal plate and an outer metal plate, the outer metal plate includes an inlet hole and an outlet hole for passing refrigerant therethrough, peripheral edges of the inner metal plate and the outer metal plate are seam-welded, in an inside portion other than the peripheral edges of the inner metal plate and the outer metal plate, the inner metal and the outer metal are partially secured by welding, portions to form secured portions, non-secured portions in the inside portion, which are portions other than the secured portions, swell outwardly, the swelling non-secured portion and the sealed peripheral edges constitute a closed refrigerant passage between the inlet hole and the outlet hole, the heating tank further comprises a cylindrical partition plate concentrically arranged with a space from an inner side of the tank main body, a height of the cylindrical partition plate is greater than a height of the cylindrical body, the hot water storage tank further comprises a cylindrical tank main body, the heat exchanger has a cylindrical shape, and is arranged concentrically with the tank main body, and a plurality of heat exchangers are concentrically arranged.

* * * * *